(12) United States Patent
Belagal Math et al.

(10) Patent No.: US 11,576,017 B2
(45) Date of Patent: Feb. 7, 2023

(54) INTELLIGENT TRANSPORTATION SYSTEM, HOST PROCESSOR, VEHICLE AND METHOD THEREFOR

(71) Applicant: NXP B.V., Eindhoven (NL)

(72) Inventors: Chetan Belagal Math, Eindhoven (NL); Hong Li, Veldhoven (NL); Sonia Heemstra de Groot, Hengelo (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/964,124

(22) Filed: Apr. 27, 2018

(65) Prior Publication Data

US 2018/0324565 A1 Nov. 8, 2018

(30) Foreign Application Priority Data

May 2, 2017 (EP) .................................... 17169091

(51) Int. Cl.
*H04W 52/46* (2009.01)
*H04W 4/46* (2018.01)
(Continued)

(52) U.S. Cl.
CPC .............. *H04W 4/46* (2018.02); *H04L 12/18* (2013.01); *H04L 12/1881* (2013.01);
(Continued)

(58) Field of Classification Search
CPC .... H04W 24/08; H04W 28/0284; H04W 4/46
See application file for complete search history.

(56) References Cited

U.S. PATENT DOCUMENTS 8,233,389 B2   7/2012  Yim et al.
8,880,009 B2  11/2014  Baldessari et al.
(Continued)

FOREIGN PATENT DOCUMENTS

CN   105792278 A   7/2016
EP      2288190 B1   7/2013
(Continued)

OTHER PUBLICATIONS

An, N., "VANET: Is 95% Probability of Packet Reception safe?", 11th International Conference on ITS Telecommunications; IEEE 2011.
(Continued)

*Primary Examiner* — Hassan Kizou
*Assistant Examiner* — Hector Reyes

(57) ABSTRACT

An intelligent transportation system (ITS) for a vehicle is described. The ITS includes: a packet count estimator arranged to receive broadcast ITS transmissions from a plurality of neighbouring vehicles and provide an indication of a number of packets received from the plurality of neighbouring vehicles, where the indication includes at least an information length and a data rate of the received packets; a fair resource allocator circuit operably coupled to the packet count estimator and configured to adjust at least one ITS broadcast transmission parameter of the ITS based on the indication of the number of received packets; and a transmitter operably coupled to the fair resource allocator circuit and configured to broadcast at least one ITS message using the adjusted at least one ITS broadcast transmission parameter.

20 Claims, 4 Drawing Sheets

(51) Int. Cl.
H04W 28/02 (2009.01)
H04L 12/18 (2006.01)
H04L 43/0894 (2022.01)
H04W 24/08 (2009.01)
H04W 84/18 (2009.01)
H04W 84/12 (2009.01)
H04L 67/12 (2022.01)
G08G 1/0967 (2006.01)

(52) U.S. Cl.
CPC ......... *H04L 43/0894* (2013.01); *H04W 24/08* (2013.01); *H04W 28/0284* (2013.01); *G08G 1/096791* (2013.01); *H04L 67/12* (2013.01); *H04W 52/46* (2013.01); *H04W 84/12* (2013.01); *H04W 84/18* (2013.01)

(56) References Cited

U.S. PATENT DOCUMENTS

| | | | |
|---|---|---|---|
| 8,948,044 B2 | 2/2015 | Bansal et al. | |
| 9,497,768 B2 | 11/2016 | Jeng et al. | |
| 2010/0267344 A1* | 10/2010 | Guner | H04B 17/382 455/67.11 |
| 2012/0236746 A1* | 9/2012 | Nagai | H04W 4/44 370/252 |
| 2015/0036487 A1* | 2/2015 | Sakata | H04W 28/0289 370/229 |
| 2015/0117335 A1* | 4/2015 | Jeng | H04W 4/40 370/329 |
| 2016/0028569 A1* | 1/2016 | Li | H04L 47/12 370/237 |
| 2017/0367005 A1* | 12/2017 | Shi | H04W 4/40 |
| 2018/0048577 A1* | 2/2018 | Gulati | H04W 52/346 |
| 2018/0109975 A1* | 4/2018 | Kalliola | H04L 43/0876 |
| 2018/0242190 A1* | 8/2018 | Khoryaev | H04W 28/0289 |

FOREIGN PATENT DOCUMENTS

| | | |
|---|---|---|
| EP | 2717615 A1 | 4/2014 |
| EP | 2276012 B1 | 8/2014 |
| EP | 2898732 A1 | 7/2015 |
| EP | 2869534 B1 | 9/2017 |
| WO | 2006011109 A1 | 2/2006 |
| WO | 2007091219 A1 | 8/2007 |
| WO | 2010040372 A1 | 4/2010 |

OTHER PUBLICATIONS

Bai, F., "Reliability Analysis of DSRC Wireless Communication for Vehicle Safety Applications", Proceedings of the IEEE Intelligent Transportation Systems Conference (ITSC), Sep. 17-20, 2006.
Belagal Math, C., "Data Rate Based Congestion Control in V2V Communication for Traffic Safety Applications", IEEE 2015.
Belagal Math, C., "Risk Assessment for Traffic Safety Applications with V2V Communications", IEEE 2016.
Belagal Math, C., "A Packet Count Based Decentralized Data-Rate Congestion Control Algorithm for V2V Communications", ICC 2017.
Belagal Math, C., "V2X Application-Reliability Analysis of Data-Rate and Message-Rate Congestion Control Algorithms", IEEE Communications Letters, vol. 21, No. 6, Jun. 2017.
"Intelligent Transport Systems (ITS); Vehicular Communications; Basic Set of Applications; Definitions", ETSI TR 102 638, V1.1.1, Jun. 2009.
"Intelligent Transport Systems (ITS); Decentralized Congestion Control Mechanisms for Intelligent Transport Systems operating in the 5 GHz range; Access layer part", ETSI TS 102 687, V1.1.1, Jul. 2011.
"Intelligent Transport Systems (ITS); STDMA recommended parameters and settings for cooperative ITS; Access Layer Part", ETSI TR 102 861, V1.1.1, Jan. 2012.
"Intelligent Transport Systems (ITS); Vehicular Communications; Basic Set of Applications; Part 2: Specification of Cooperative Awareness Basic Service", ETSI EN 302 637-2, V1.3.2, Nov. 2014.
"Intelligent Transport Systems (ITS); Cross Layer DCC Management Entity for operation in the ITS G5A and ITS G5B medium", ETSI TS 103 175, V1.1.1, Jun. 2015.
Fallah, Y., "Analysis on Information Dissemination in Vehicular Ad-Hoc Networks With Application to Cooperative Vehicle Safety Systems", IEEE Transactions om Vehicular Technology, vol. 60, No. 1, Jan. 2011.
Fernandez, J., "Dynamic Channel Equalization for IEEE 802.11p Waveforms in the Vehicle-to-Vehicle Channel", Forty-Eighth Annual Allerton Conference, Allerton House, UIUC, Illinois USA, Sep. 29-Oct. 1, 2010.
Hartenstein, H., "A Tutorial Survey on Vehicular Ad Hoc Networks", IEEE Communcations Magazine, Jun. 2008; IEEE 2008.
Kenney, J., "LIMERIC: a linear message rate control algorithm for vehicular DSRC systems", DOI: 10.1145/2030698.2030702— Source: DBLP, Conference Paper, Sep. 2011.
Krajzewicz, D., "Recent Development and Applications of SUMO— Simulation of Urban Mobility"; http://www.iariajournals.org/systems_and_measurements/; International Journal on Advances in Systems and Measurements, vol. 5, Nos. 3 & 4, year 2012.
SAE International, Dedicated Short Range Communications (DSRC) Message Set Dictionary; SAE J2735; Fact Sheet Sep. 25, 2009.
Sucharita, Ch. V.S., "A Review on Broadcast Storm Mitigation Techniques in Vehicular Ad hoc Networks"; ISBN 978-93-85818-80-6; International Conference on Advances in Computing Logic, Technology and Sciences—2016.
Torrent-Moreno, M., "Vehicle-to-Vehicle Communication: Fair Transmit Power Control for Safety-Critical Information"; IEEE Transactions on Vehicular Technology, vol. 58, No. 7, Sep. 2009.
"Vehicle Safety Communications Project: Task 3 Final Report— Identify Intelligent Vehicle Safety Applications Enabled by DSRC"; TRID; International Transport Forum, Transport Safety & Security; https://trid.org.view/757708; downloaded Mar. 15, 2018.
Zang, Y., "A Novel MAC Protocol for Throughput Sensitive Applications in Vehicular Environments", Proceedings of IEEE 65th Vehicular Technology Conference, Apr. 2007.
Zang, Y., "Congestion Control in Wireless Networks for Vehicular Safety Applications", Proceedings of 8th European Wireless Conference, Jul. 2007.

* cited by examiner

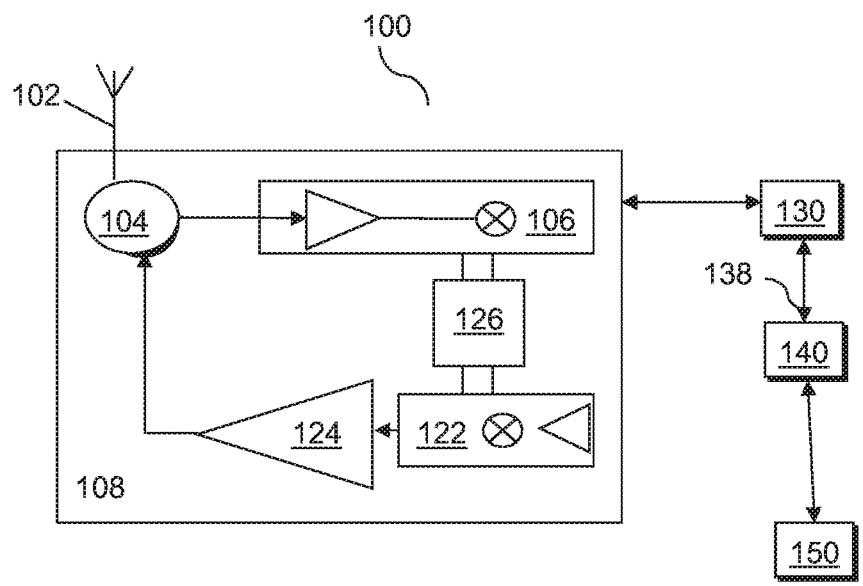
FIG. 1 – Prior Art
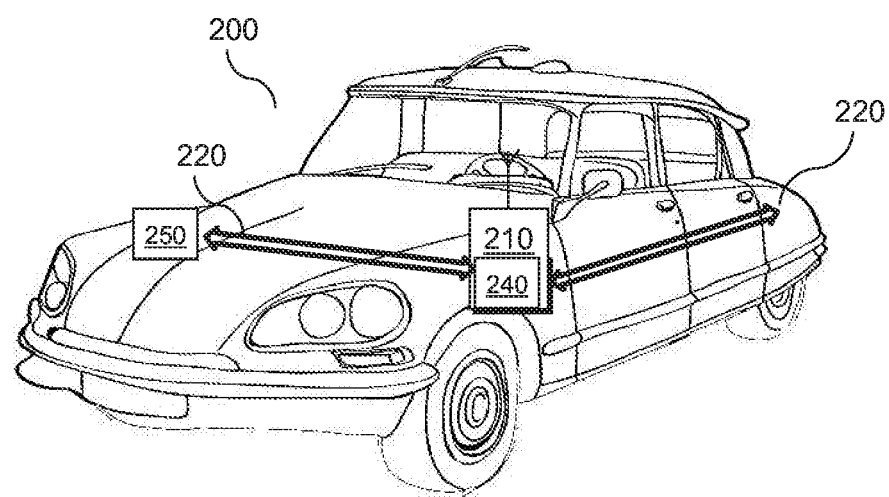
FIG. 2

INTELLIGENT TRANSPORTATION SYSTEM, HOST PROCESSOR, VEHICLE AND METHOD THEREFOR

CROSS-REFERENCE TO RELATED APPLICATIONS

This application claims the priority under 35 U.S.C. § 119 of European Patent application no. 17169091.0, filed on 2 May 2017, the contents of which are incorporated by reference herein.

FIELD OF THE INVENTION

The field of the invention relates to an intelligent transportation system (ITS), a host processor, a vehicle and a method therefor. The invention is applicable to, but not limited to, a mechanism to adaptively control a usage of resource when broadcasting ITS messages, and thereby control channel load, based on packet count.

BACKGROUND OF THE INVENTION

It is known that road usage by vehicles continues to increase, year on year. Increased road usage causes many problems, such as increased congestion, longer travel time, higher travel costs, increased air pollution, increased accident risk, etc. In order to cope with this steady increase, solutions are required to better manage vehicle road usage. A possible solution is to construct new roads, which is unlikely to happen on a large enough scale. A further solution is to reduce traffic and/or provide alternative transportation options, neither of which is viable in most practical scenarios.

A further solution that is being widely researched and developed is the use of intelligent traffic (or transportation) systems (ITSs). The European Commission Mobility & Transport Department reported that more than one million traffic accidents have caused over 25,000 fatalities. As such, ITS has evolved to be a promising solution to improve traffic safety. ITS is being developed for a variety of applications, such as a stationary vehicle warning following an accident or vehicle problem, traffic condition warning (such as a traffic jam ahead warning), regulatory/contextual speed limits, road work warnings, detour notifications, etc. Some ITS solutions propose a communication backbone employing V2X communication (i.e. a vehicle-to-vehicle infrastructure).

In ITS, broadcasting of real-time information of cars, e.g. their positions and speed, road conditions, events and accidents, is performed in a form of beacon messages via a Vehicular Ad-hoc NETwork (VANET) built on IEEE 802.11p and a dedicated short-range communication (DSRC). The broadcast information is received from neighbouring vehicles, and enables nodes (sometimes referred to as ITS stations) to create a dynamic map of its neighbours and to some degree their operational status. This dynamic map helps to track the ITS station's neighbours and predict dangerous situations, thereby enabling various safety applications, as described in 'Intelligent Transport Systems (ITS); Vehicular Communications; Basic Set of Applications; Definitions' authored by the European Telecommunications Standards Institute (ETSI) Intelligent Transport Systems (ITS), Tech. Rep., 2009. It is anticipated that future autonomous vehicles will require even higher level of safety, together with better supporting technologies in order to realize reliable safety applications.

Safety applications such as ITS require reliable communication in order to satisfy various technical constraints, such as minimum message rate and range. Such technical constraints need to be satisfied by all nodes/ITS stations within the 'awareness range' of the application. Awareness range is defined as the minimum distance between the vehicles at which the applications should predict a potential collision, such that the manoeuver of vehicles would avoid a potentially catastrophic accident.

One known ITS station 100 is shown in FIG. 1. ITS station 100 includes a wireless transceiver integrated circuit (TRx IC) 108 that comprises wireless transmitter and a wireless receiver connected to an antenna 102. The receiver is arranged to receive ITS messages broadcast from other local vehicles or fixed roadside units. The transmitter is arranged to broadcast ITS messages to other local vehicles or fixed roadside units.

The wireless TRx IC 108 is coupled to a baseband (BB) circuit 130, which may be of the form of a digital signal processor (DSP) and include, say, quadrature channel low pass filters (LPFs) and quadrature analog to digital converters ADCs functionality. Communication between the wireless TRx IC 108 and the BB circuit 130 may use the IEEE 802.11p communication protocol. The IEEE 802.11p is an update to the IEEE 802.11 standard that adds wireless access in vehicular environments (WAVE), namely enhancements to 802.11 required to support ITS applications. This includes data exchange between high-speed vehicles and between the vehicles and the roadside infrastructure in the licensed ITS band of 5.9 GHz (5.85-5.925 GHz). IEEE 1609 is a higher layer standard based on the IEEE 802.11p. The BB circuit 130 typically performs the processing up to a data link layer (physical (PHY) layer and part of the medium access control (MAC) layer).

The system has a micro controller unit (MCU) 140 that is connected, via, say, a universal signal bus (USB) 138, to the BB circuit 130 that executes a protocol 1609 stack, and thus converts IEEE1609 messages into radio frequency (RF) signals for broadcasting. The MCU 140 is also coupled to a security circuit 150 that is used for signature generation for IEEE 1609.2 messages. ITS 100 is thereby able to receive 802.11p packets with messages from other vehicles, as well as transmit 802.11p packets with messages to other vehicles. In the current scenario 802.11 MAC would decide when a channel is free for it to broadcast the message. An ITS enabled vehicle broadcasts information to all other surrounding vehicles, which are similarly enabled. In this way, the surrounding vehicles can interrogate and process received ITS messages and build up an understanding of their surroundings vis-à-vis other vehicles or road events.

However, it is known that channel congestion is one of the most critical issues in IEEE 802.11p-based vehicular ad-hoc networks because congestion may lead to unreliability of applications. As a counter measure, ETSI proposed a mandatory Decentralized Congestion Control (DCC) framework to keep the channel load below a specific level in order to avoid such congestion. DCC algorithms are therefore focused on tuning one or more operational parameters, such as transmit power, message-rate and data-rate, in order to avoid/limit congestion.

Most DCC algorithms are based on a parameter termed Channel Busy Ratio (CBR), which is a measure of the channel load that indicates a fraction of time that the channel is sensed as being 'busy' by a node/ITS station. A CBR measurement is sufficient for a single data-rate network, so it is suitable for the proposed DSRC VANET, which uses only a default 6 Mbps data rate for use by the ITS stations.

Message-rate and transmit-power based congestion control schemes try to maintain CBR below a channel load threshold ($CBR_T$) by decreasing either the message-rate or the communication range, thereby reducing the load by maintaining the same channel capacity. On the contrary, the data-rate based approaches increase the channel capacity by transmitting packets at higher data-rates and therefore in shorter transmission time, thereby disturbing channel capacity.

The inventors of the present invention have recognised and appreciated that CBR measurements are not able to measure the channel usage effectively, particularly in networks that support multiple data-rates. This is primarily due to variation in collisions and propagation fading in a wireless channel when multiple data rates are being employed. They have further recognised and appreciated that the problem becomes worse in very high density mobile environments, for example as CBR only represents a fraction of time over which a channel is busy. Furthermore, when the inventors considered data-rate DCC functioning on CBR measurements alone, a channel with 10 packets at 6 Mbps and 20 Packets at 12 Mbps may both have the same CBR. Thus, CBR doesn't provide accurate information of channel load and varies depending on selected data-rate. Thus, two nearby nodes may be experiencing a CBR of, say, 0.6, and may select 6 Mbps and 12 Mbps or even 24 Mbps data-rates to use, thereby leading to an unfair data-rate allocation among nodes experiencing similar channel load conditions. To further explain this problem, let us consider a channel with packets transmitted at 6 Mbps data-rate with packet transmission time of 540 microseconds. In order to maintain a CBR of 0.7 the maximum number of packets that the channel can support is 1296 packets. Similarly, if 12 Mbps is used with a transmission time of 360 microseconds in order to maintain a CBR of 0.7 then the maximum number of packets that can be transmitted is increased to 1944 because the channel capacity is increased. Thus CBR alone cannot provide sufficient information regarding effective channel load and the resultant outcome is dependent on the data-rate selected.

This unfair allocation of data-rates will cause different nodes with similar channel activity to have different transmission ranges, and also adversely affect applications that are in need of reliable information exchange. A suitable, fairer solution is desired.

SUMMARY OF THE INVENTION

The present invention provides an intelligent transportation system, a host processor, a vehicle and a method therefor, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified known block diagram of an intelligent transportation system (ITS).

FIG. 2 illustrates a simplified diagram of a vehicle employing an ITS station, adapted to control broadcast ITS messages, and thereby channel load, based on packet count, according to example embodiments of the invention.

DETAILED DESCRIPTION

Figure 3:
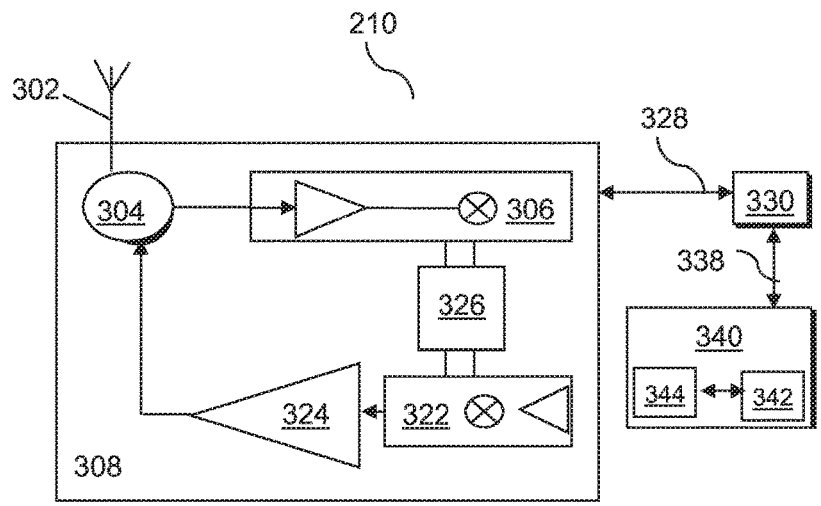
FIG. 3 illustrates a simplified first example block diagram of an ITS station, adapted to control broadcast ITS messages, and thereby channel load, based on packet count, according to example embodiments of the invention.

The inventors of the present invention have recognized and appreciated that a mechanism to control broadcast ITS messages, and thereby channel load, in an intelligent transportation system and based on packet count would be an improvement over the known use of CBR measurements, which are not able to measure the channel usage effectively, due to e.g. collisions and propagation fading in a wireless channel. A packet-count approach enables a fair-allocation of channel resources in order to improve a fairness of a Decentralized Congestion Control (DCC) algorithm. In some examples, a fair-usage of channel resources may be implemented in terms of adjusting one or more of: message rate, transmission power, data rate, in response to the determined packet count. In some examples, the use of packet count based data rate (PDR)-DCC enforces a homogeneous data-rate selection amongst all vehicles, thereby providing fairness throughout the VANET. Advantageously, the packet count based channel load measurements also provide a more accurate representation of channel load than CBR, irrespective of the data-rates, message-rate and transmit power that are prevalent, thereby reducing or eliminating the unfair data-rate allocation issue that exists in pure CBR based approaches.

In this manner, a packet count approach to assessing channel loading addresses a problem when channel capacity varies in responses to different supported data rates being used, and thus enables more accurate estimation of channel load to be determined. Examples of the invention find applicability in networks that use multiple data rates, as the concepts herein described may improve the application reliability in heavy traffic situations, particularly when a data rate, from a plurality of selectable data rates, may be selected by the respective ITS stations.

Aspects of the invention describe an intelligent transportation system (ITS), for a vehicle, a vehicle and a host processor configured to support ITS operations. The ITS, vehicle and/or host processor includes a packet count estimator arranged to receive broadcast ITS transmissions from a plurality of neighbouring vehicles and provide an indication of a number of packets received from the plurality of neighbouring vehicles, where the indication includes at least an information length and a data rate of the received packets; a fair resource allocator circuit operably coupled to the packet count estimator and configured to adjust at least one ITS broadcast transmission parameter of the ITS based on the indication of the number of received packets; and a transmitter operably coupled to the fair resource allocator circuit (410) and configured to broadcast at least one ITS message using the adjusted at least one ITS broadcast transmission parameter. In this manner, the fair resource allocator is able to adjust at least one ITS broadcast transmission parameter based on a packet count estimate. Thus, a better representation of a channel load in an ITS may be achieved compared to the known approach to use solely a CBR measurement.

In some examples, the packet count estimator may be configured to receive physical layer information of the broadcast ITS transmissions and determine therefrom the number of packets received from the plurality of neighbouring vehicles. In some examples, the at least one ITS broadcast transmission parameter may be from a group of: transmission data-rate, transmission message-rate, transmit power. The packet count is then used to schedule resource and allocate transmitter parameters in order to achieve a desired DCC.

In some examples, a channel busy ratio, CBR, circuit may be arranged to sense when a communication channel is being used to receive ITS information and provide an indication of a time that the channel is in use, such that the packet count estimator may be configured to use the indication of time, together with the indication of at least an information length and a data rate of the received packets, in a determination of a number of packets received from the, or each of the, plurality of neighbouring vehicles.

In some examples, a memory may be coupled to the fair resource allocator circuit and the packet count estimator and arranged to store at least one of: packet count data, ITS broadcast transmission parameter data, an indication of at least an information length and a data rate of the received packets, wherein the fair resource allocator circuit may be configured to adjust at least one ITS broadcast transmission parameter of the ITS based on at least a portion of the stored data.

In some examples, the packet count estimation performed by packet count estimator may be based on a total of: packets sent, packets received, and a total number of packets sensed by the physical layer, while at least the communication channel employed by the ITS is busy. In some examples, the total packet count may be determined over a specified time period (θ) and whilst the vehicle is not sending ITS packets.

In some examples, the ITS may be configured to provide an indication of the adjusted at least one ITS broadcast transmission parameter to a vehicle to roadside (V2X) infrastructure or on a vehicle to vehicle (V2V) basis. In some examples, the ITS may support a plurality of different data rates and the fair resource allocator circuit switches the ITS broadcast transmission parameter between two of the plurality of different data rates based at least in part on the indication of the number of received packets.

In another aspect of the invention, a method for operating an intelligent transportation system, ITS, for a vehicle, is described. The method includes receiving broadcast ITS transmissions from a plurality of neighbouring vehicles; providing an indication of a number of packets received from the plurality of neighbouring vehicles, where the indication includes at least an information length and a data rate of the received packets; adjusting at least one ITS broadcast transmission parameter of the ITS based on the indication of the number of received packets; and broadcasting at least one ITS message using the adjusted at least one ITS broadcast transmission parameter.

Referring now to FIG. 2, a simplified diagram of a vehicle 200 employing an ITS station 210, adapted to control broadcast ITS messages, and thereby channel load, based on packet count, is illustrated according to example embodiments of the invention. The ITS station includes a packet count estimator arranged to receive broadcast ITS transmissions from a plurality of neighbouring vehicles and provide an indication of a number of packets received from the plurality of neighbouring vehicles, where the indication includes at least an information length and a data rate of the received packets; and a fair resource allocator circuit operably coupled to the packet count estimator and configured to adjust at least one ITS broadcast transmission parameter of the ITS based on the indication of the number of received packets. The ITS station further includes a transmitter operably coupled to the fair resource allocator circuit and configured to broadcast at least one ITS message using the adjusted at least one ITS broadcast transmission parameter.

In this example, the ITS station 210 comprises an MCU 240 operably coupled to other circuits and components (not shown). The MCU 240 is operably coupled to other components or circuits in the vehicle, e.g. a speed sensor 250, via, say, an integrated communication bus network 220, such as a Controller Area Network (CAN or CAN-bus) or a Local Interconnect Network (LIN). A CAN or CAN-bus is a vehicle bus standard that is designed to allow microcontrollers and devices to communicate with each other within a vehicle without a need for a host computer. LIN is a serial network protocol used for communication between components in vehicles. In this example, the MCU 240 is adapted to control a data rate of broadcast ITS messages, and thereby channel load, based on packet count as described below.

Although examples of the invention are described with reference to a vehicle such as a car, as illustrated in FIG. 2, it is envisaged that any road transport device may use the concepts herein described, such as trucks, motorcycles, buses, etc.

Referring now to FIG. 3, a simplified example block diagram of an ITS station (ITS) 210, adapted to control a rate of broadcast ITS messages, and thereby channel load, based on packet count, is illustrated according to example embodiments of the invention. The ITS station 210 includes a wireless transceiver integrated circuit 308 that comprises a wireless transmitter and a wireless receiver connected to an antenna 302 via an isolation component or circuit 304, which may be a duplex filter or antenna switch that isolates signals between the transmitter and receiver circuits. In this example, the wireless transceiver integrated circuit 308 is configured to operate at 2.4 GHz or 5.9 GHz.

One or more receiver chains, as known in the art, include (s) receiver front-end circuitry 306 (effectively providing reception, low-noise amplification, filtering and intermediate or base-band frequency conversion). In example embodiments, the receiver receives a radio frequency, RF, signal and converts the received RF signal to a digital quadrature received signal. The receiver front end circuit 306, for example, may comprise a low noise amplifier (LNA) coupled to two frequency down-conversion quadrature mixers, fed from a quadrature local oscillator 326. The receiver front-end circuitry 306 is arranged to receive ITS messages broadcast from other local vehicles or fixed roadside units.

In a transmitter chain sense, the transmitter comprises quadrature frequency up-conversion circuit 322, which contains quadrature up-mixer circuit(s) and may contain amplification and additional filtering circuits, arranged to up-convert differential quadrature signals 328 from baseband (BB) circuit 330 which includes quadrature digital-to-analog converters (DACs). The frequency up-conversion circuit 322 combines the two resultant mixed quadrature signals before being input to power amplifier (PA) 324, which amplifies the combined signal prior to transmission. PA 324 outputs the up-converted and amplified transmit signal to isolation component or circuit 304 and thereafter antenna 302. The transmitter is arranged to broadcast ITS messages to other local vehicles or fixed roadside units.

The receiver front end circuit 306 is also coupled to BB circuit 330, which may be of the form of a digital signal processor (DSP) and comprise quadrature channel low pass filters (LPFs) and quadrature analog to digital converters ADCs. Communication between the wireless transceiver integrated circuit 308 and the BB circuit 330 may use the 802.11p communication protocol. The BB circuit 330 performs the processing up to a data link layer (physical (PHY) layer and part of the medium access control (MAC) layer). The ITS station 210 has a microcontroller unit (MCU) 340, sometimes referred to hereafter as a host processor, which is connected, via say a universal signal bus (USB) 338 or SDIO or Ethernet interface, to the BB circuit 330. The BB circuit 330 executes an IEEE1609 stack, and thus converts IEEE1609 messages into RF signals for broadcasting. The MCU 340 includes a packet count circuit 342 (or logic) configured to count a number of packets received by broadcast transmissions from neighbouring vehicles.

In some examples, packet count circuit 342 calculates a packet count ($P_C$) for each data packet received from each neighbouring ITS station/node, based on information received from the physical layer communications. The total transmitted packets $P_T$ at an ITS station/node, and the total time taken or transmission $T_{TX}$ over a period θ, can be obtained from this physical layer data. In some examples, such a packet count is performed only when the channels is sensed as being busy. In this example, there are three instances where the channel may be sensed as being 'busy', e.g. when: (i) the node is transmitting a packet; (ii) the node is receiving a packet; (iii) the node is neither transmitting nor receiving, however the signal strength is identified as being higher than a Carrier Sensing Threshold (CST), due to collisions, interference, etc.

The packets received at the physical layer of IEEE 802.11p consist of preamble, signal field and payload. The preamble field represents the beginning of the frame and the signal field is used to specify the data-rate and packet transmission time. In some examples, this information is used to calculate the total number of packets that are successfully sensed by the receiver ($P_R$) and the total time the channel is sensed busy due to the reception at physical layer ($T_{RX}$). In order to obtain $P_B$, the total number of packets and $T_{BU}$, i.e. the total time during which the channel is busy while not able to receive or transmit, some examples propose to utilize a CBR measurement, as illustrated in equation [1] and $P_B$ may be obtained from a linear estimation over time ($T_{BU}$), such as Illustrated in equation [3]. In this example, the packet count ($P_C$) of the physical layer is obtained from $P_T$, $P_R$ and $P_B$, as illustrated in equation [2].

$$T_{BU}=(CBR \times \theta)-(T_{TX}+T_{RX}) \quad [1]$$

$$P_c=P_R+P_T+P_B \quad [2]$$

Where:
$P_C$ is the total packet count
$P_T$ is the total number of transmitted packets;
$P_R$ is the total number of packets successfully sensed by the receiver; and
$P_B$ is the total number of packets during which the channel is busy while not receiving or transmitting.

$$P_B=((P_T+P_R)\times T_{BU})/(T_{TX}+T_{RX}) \quad [3]$$

It is envisaged in other examples that the $P_C$ estimation may be performed by various other approaches, such as machine learning, adaptive error correction, etc., in order to further improve accuracy.

The packet count circuit 342 is thus arranged to receive broadcast ITS transmissions from a plurality of neighbouring vehicles and provide an indication of a number of packets received from the plurality of neighbouring vehicles, where the indication includes at least an information length and a data rate of the received packets. In this example, the packet count circuit 342 is coupled to a fair resource allocator circuit 344, which in some examples may include a message data rate control circuit 344 configured to adjust at least one ITS broadcast transmission parameter of the ITS, such as control a rate of broadcast ITS messages, based on the indication of the number of received packets. The ITS station further includes a transmitter operably coupled to the fair resource allocator circuit 344 and configured to broadcast at least one ITS message using the adjusted at least one ITS broadcast transmission parameter.

Thus, in some examples, by obtaining physical layer information of received packets, the packet count circuit 342 is able to calculate a number of packets received from the plurality of neighbouring vehicles, based on at least the physical layer information of an information length and a data rate of the received packets. In some examples, the information may be derived from the packet length and modulation-coding scheme indicator in the physical layer signal field and packet header of each 802.11p packet. The packet count information is then utilized to select a minimum possible data rate to avoid congestion and enables maximum possible range and reliability of safety applications.

In some examples, the MCU 340 may be configured to support multiple data rates for broadcast ITS transmissions and select a data rate for use based on a determined packet count. If the MCU 340 determines, after processing the packet count information, that the data rate of the ITS transmissions from the vehicle is to be reduced, the MCU 340 is configured to adapt the data rate of ITS messages that are broadcast from the vehicle, and vice versa.

Furthermore, in this manner and when employed in multiple vehicles, the ITS application itself, within each of a majority or all of a number of localised vehicles, may be configured to intelligently decide on a data rate of messages (or another parameter associated with the ITS transmissions) that it is going to broadcast in a given time period. In this manner, a number of vehicles that are in a localised area and, say, moving slowly due to a traffic jam, may each increase the data rate of ITS messages that they broadcast, which will in turn not reduce too much the number of received ITS messages that they receive and process. The vehicles use these ITS messages to calculate the positions of the vehicles around it. Therefore, even for a slow moving vehicle with a increase data rate of messages it is still possible to calculate its relative position, vis-à-vis other vehicles in its vicinity.

In some instances, this decision may subsequently include dynamically varying the data rate of messages sent by each vehicle proportional to the determined packet count performed by each vehicle. When applied by multiple vehicles, the data rate of messages that each vehicle needs to process is effectively impacted. Thereafter, for example and in response to an adjustment of a data rate used for ITS transmissions in slow-moving traffic, it is envisaged that the vehicles create enough channel capacity to process, same number of messages/second irrespective of density.

In some examples, the host processor may be configured to maintain a minimum rate of messages/second to be sent out. In this manner, the host processor ensures that other moving vehicles are informed about the vehicle's position. In some examples, the minimum rate of messages/second to be sent out may include any mandatory messages that are to be sent, such as safety messages, e.g. a SOS message, a vehicle breakdown message, a message following a crash, etc.

Figure 4:
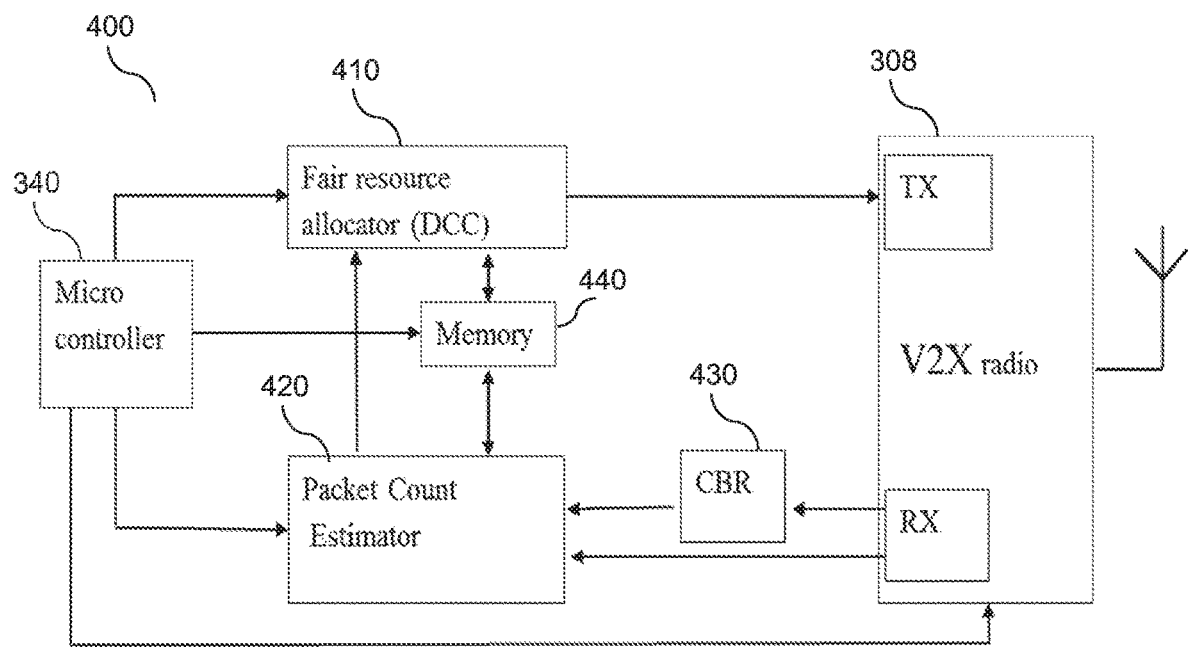
FIG. 4 illustrates a simplified second example block diagram of an ITS station, adapted to control broadcast ITS messages, and thereby channel load, based on packet count, according to example embodiments of the invention.

Referring now to FIG. 4, a simplified second example of an ITS station, adapted to control broadcast ITS messages, and thereby channel load, based on packet count, is illustrated according to example embodiments of the invention. In this example, a host processor, such as MCU 240 from FIG. 2 or MCU 340 from FIG. 3, is configured to perform a number of ITS functions, but in this example the functionality for implementing a packet-count based DCC technique according to some examples of the invention resides in stand-alone circuits or logic or processors coupled to the MCU 340.

In accordance with some examples, a packet count estimation processor calculates a packet count for each received signal based on physical layer information from a receiver (Rx) in, say, wireless TRx IC 308. In some examples, depending upon how receiver senses the channel and the data-rate information is present in the packet header itself is used to calculate a total time taken by a packet. In some examples, no additional information needs to be taken into account. In some examples, the packet count estimation may be based on a total number of packets sent, received, and a total number of packets sensed by the physical layer, while the channel is busy, without the vehicle sending or receiving a packet by a vehicle over a period θ. In some examples, there are three cases where the channel is sensed as 'busy' that are considered in order to measure a total number of packets in the channel. The transmitted packets are also part of the channel load, thus they are taken into account so that each ITS station can determine the correct or suitable to transmit parameter(s) to use to broadcast ITS information. These measurements are performed based on various receiver (Rx) data and CBR measurements from CBR circuit 430.

In some examples, the packet count approach may be further improved by using the measured history and environmental information, stored in memory 440. For instance, if packets from a vehicle were counted in the previous period, but not received in the current period, and the road is a closing highway and the vehicle is very-likely still in the range, the packet count of the vehicle in the previous period can be factored into the count in the current period. In some examples, sliding window filtering based on previous measured history can improve packet count. In some examples, such additional stored information may be useful when the channel does not have a good packet reception ratio and is heavily congested (e.g. 95% or greater). The objective of PDR-DCC is to avoid congestion (e.g. 70% or lesser), which further enables accurate packet count measurements.

In this example, once a packet count is estimated the ITS station 400 is able to tune or adapt one or various parameters, such as message-rate, data-rate, and combine this strategy at the transmitter (TX) based on one or more DCC algorithm that is used, in order to avoid congestion. In this regard, host processor 410 is configured to determine and implement a fair resource allocation DCC and may also perform an ITS message generation function that includes adaptively modifying a rate of broadcasting ITS messages to other vehicles. In some examples, host processor 410 may adapt only the data-rate of broadcast ITS messages in response to the PDR-DCC determination. However, in other examples, it is envisaged that other parameters, such as one or more of: message-rate, transmit power, etc. may be adapted in a similar manner.

In some examples, it is envisaged that the aforementioned packet count technique provides better information of channel load than CBR. The packet count estimation circuit 420 and host processor 410 that implements a fair resource allocation DCC may be based on how the physical layer senses the channel and can be implemented without CBR. The packet count estimator 420 is configured to receive broadcast ITS transmissions from a plurality of neighbouring vehicles and provide an indication of a number of packets received from the plurality of neighbouring vehicles, where the indication includes at least an information length and a data rate of the received packets. In some examples, the described technique requires a knowledge of a total time that the channel is busy without any transmission or reception ($T_{BU}$). However, as CBR information already exists (through it being mandated in the Standard), some examples additionally use such CBR information to obtain the value of $T_{BU}$ and thereafter use the packet count estimation circuit 420 to determine ITS broadcast transmission parameter(s) to adapt.

In this example, the transceiver integrated circuit 308 and associated baseband circuitry may also perform V2x Wireless MAC layer functionality, for example consistent with European Telecommunication Standards Institute (ETSI) ES 202 663 and in accordance with IEEE1609.4, In this example, the transceiver integrated circuit 308 and associated baseband circuit may also perform V2x Wireless physical (PHY) layer functionality, for example consistent with IEE802.11p, ETSI ES 202 663 and in accordance with ISO21215. It is understood that the standards that are adopted around the World may very, and thus the examples described above, when employed in other implementations, may be replaced by similar technologies or Standard specifications other than IEEE1609.

Figure 5:
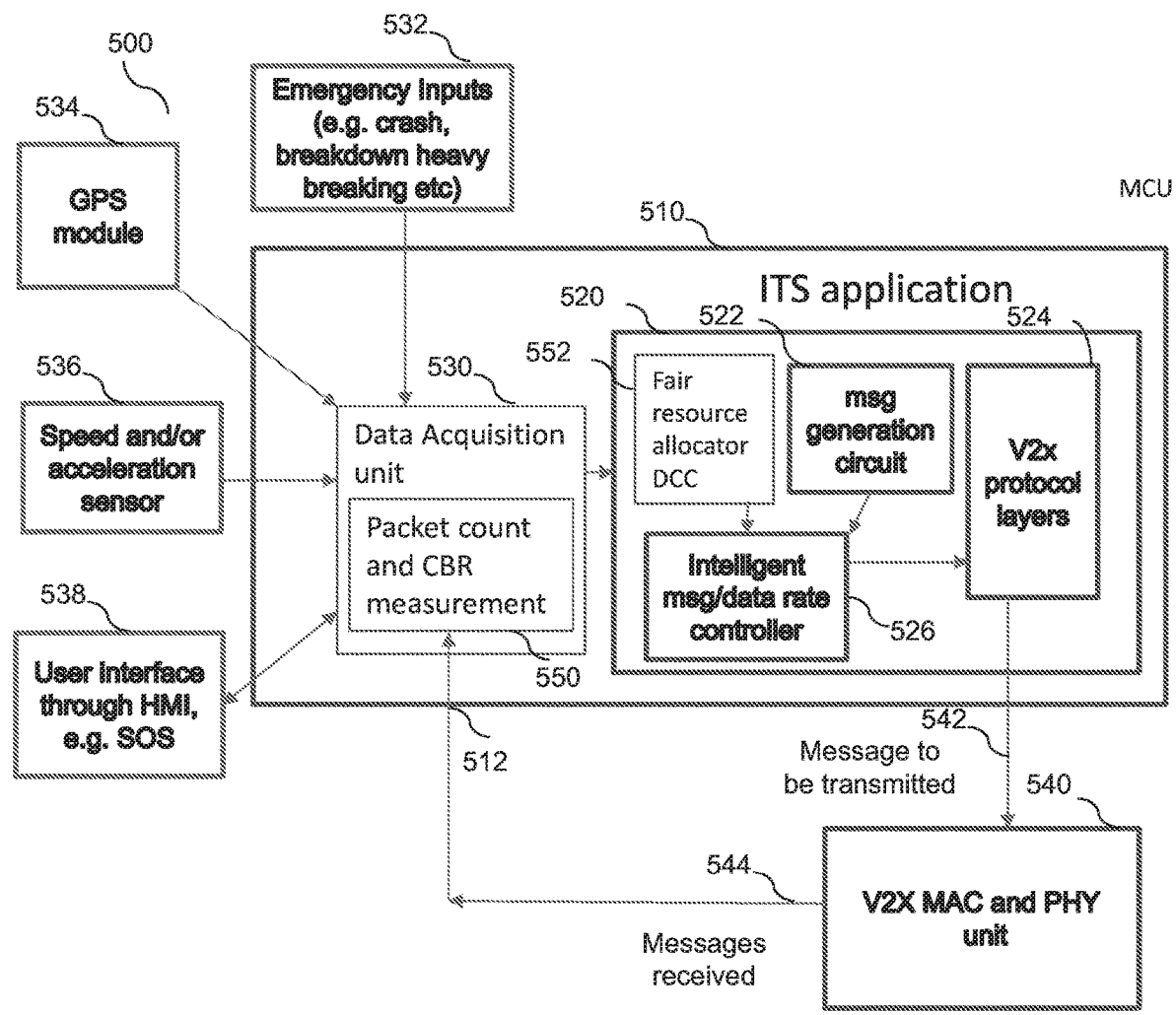
FIG. 5 illustrates a simplified example block diagram of a host processor configured to support an ITS station adapted to control broadcast ITS messages, and thereby channel load, based on packet count, according to example embodiments of the invention.

Referring now to FIG. 5, a simplified example block diagram 500 of a host processor 510, configured to support an ITS application 520, is illustrated according to example embodiments of the invention. In the example block diagram 500, the host processor 510 may be the main or sub control unit in the vehicle. In some examples, the host processor 510 may have one or more micro controller units (MCUs), of which one of the MCUs might be configured to adaptively control a usage of resource when broadcasting ITS messages, and thereby control or influence channel load in the system/VANET, based on packet count.

In this example, the host processor 510 includes a data acquisition circuit 530, which is operably coupled to a number of external circuits. For example, the data acquisition circuit 530 may be coupled to an emergency input circuit 532 configured to determine a vehicular crash, or a breakdown or heavy braking, etc. In some examples, the data acquisition circuit 530 may be also coupled to a user interface circuit 538, for example a human-machine interface (HMI), which is capable of receiving an SOS message or displaying information relayed from emergency input circuit 532. In some examples, the host processor may be configured to process speed-related information from a speed-related sensor circuit 536, for example configured to provide vehicle speed and/or acceleration information to the host processor 510. In some examples, the host processor may be configured to pass the information to the user interface circuit 538 for displaying speed and/or acceleration data to a vehicle user (e.g. passenger or driver). In some examples, the data acquisition circuit 530 of the host processor 510 may be configured to process the speed-related information and provide warning information, say via an audible or visual warning, indicative of sudden breaking of either the vehicle or surrounding vehicles.

In accordance with some examples, the data acquisition circuit 530 of the host processor 510 is operably coupled, via an input port 512, to a V2X (and/or a V2V) MAC and physical layer circuit 540, for example configured to handle transmission 542 and reception 544 of broadcast ITS messages.

In this example, the data acquisition circuit 530 is coupled to the ITS application circuit 520, which in some examples includes a message generation circuit 522, coupled to an intelligent message/data rate controller 526. In this example, the ITS application circuit 520 also includes a fair resource allocator DCC circuit 552 arranged to determine whether one or more ITS resource(s) needs to be changed and implement such a change when desired. In this example, such a change is based on the information received from the packet count and CBR measurement circuit 550, which in this example is located within data acquisition circuit 530.

Thus, packet count and CBR measurement circuit 550 is configured to receive broadcast ITS transmissions from a plurality of neighbouring vehicles and provide an indication of a number of packets received from the plurality of neighbouring vehicles, where the indication includes at least an information length and a data rate of the received packets. Fair resource allocator DCC circuit 552 is configured to adjust at least one ITS broadcast transmission parameter of the ITS, based on the indication of a number of received packets.

In this manner, in one example, physical layer information obtained from, say, V2X (and/or a V2V) MAC and physical layer circuit 540 is processed by the packet count and CBR measurement circuit 550 of data acquisition circuit 530 and routed to the fair resource allocator DCC circuit 552 of the ITS application circuit 520. Based on the packet count information, the fair resource allocator DCC circuit 552 may influence the intelligent message/data rate controller 526 to, say, adapt a data rate of ITS messages that are generated by message generation circuit 522 and ultimately broadcast by the vehicle. In some examples, the packet count information may include an indication of at least an information length and a data rate of the received packets. Thus, in this example, the ITS application circuit 520 includes one or more processing circuit(s) configured to process the received packet count information and adapt a performance of the ITS of the vehicle in response thereto, e.g. reduce a data rate of ITS messages that are generated by the ITS message circuit 522 to be broadcast from the vehicle.

In some examples, the host processor may be configured to process the received packet count information and log the data in memory (not shown), so that the data, or the subsequent changes effected with one or more resources, can be subsequently used by the vehicle's ITS station.

In some examples, the host processor may be configured to process the packet count information and provide any information relating to a fair resource allocation amongst a number of ITS stations/vehicles to a V2X infrastructure, e.g. for monitoring and broadcast to all users for centrally-controlled safety-related purposes.

Figure 6:
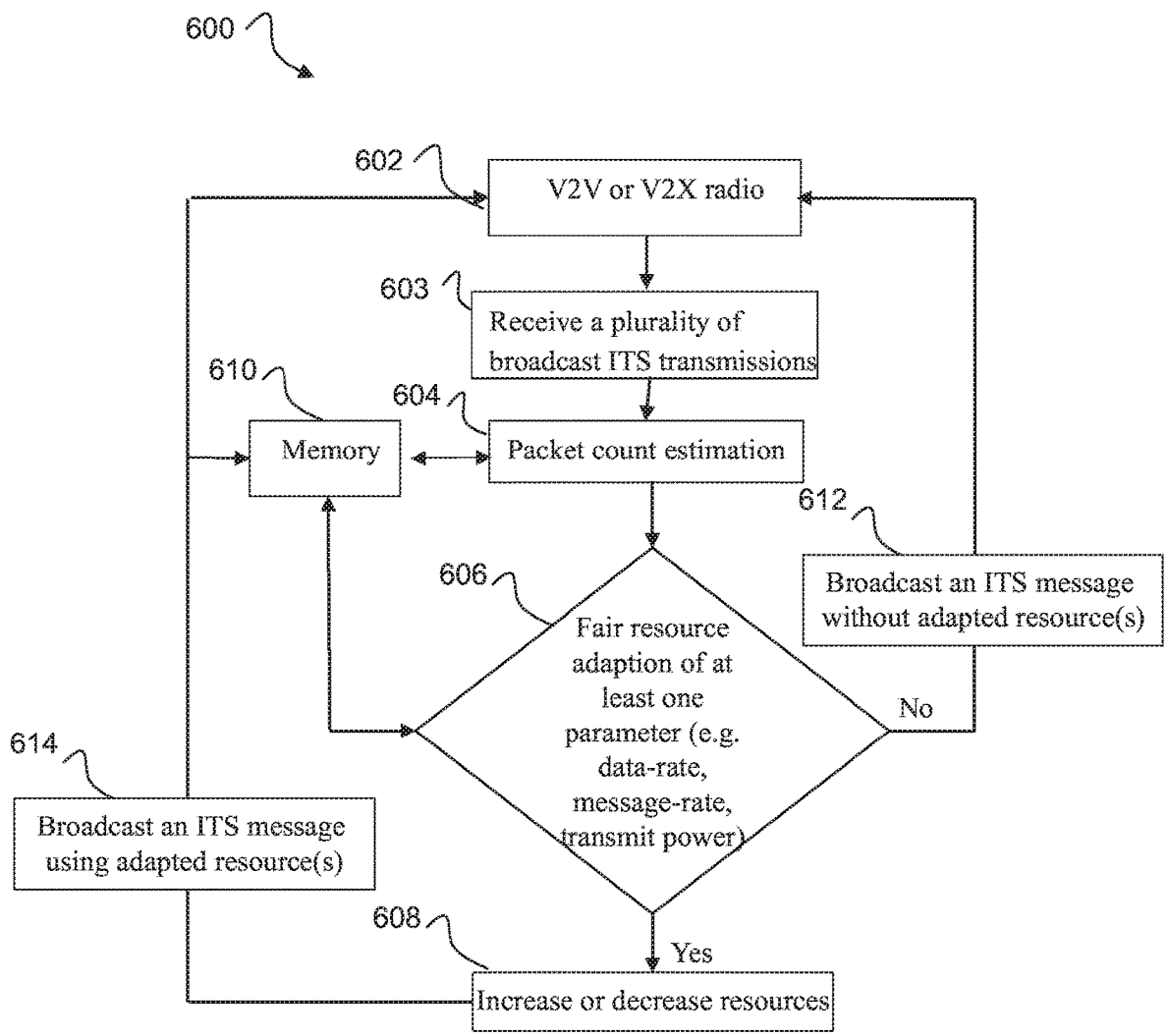
FIG. 6 illustrates an example flow chart for controlling broadcast ITS messages, and thereby channel load, in an intelligent transportation system and based on packet count, according to example embodiments of the invention.

Referring now to FIG. 6, an example flow chart 600 illustrates a method for adaptively controlling a usage of resource when broadcasting ITS messages, and thereby control of channel load, based on packet count, according to example embodiments of the invention. The flowchart 600 starts with a vehicle at 602 with an ITS station capable of operating in a vehicle to vehicle (V2V) or vehicle to roadside infrastructure (V2X) mode of operation. At 603, the ITS station receives broadcast ITS transmissions from a plurality of neighbouring vehicles. At 604, the ITS station initiates a packet count estimation mode of operation. In some examples, the packet count estimation mode of operation at 604 may obtain data from memory in 610. The packet count estimation may provide an indication of a number of packets received from the plurality of neighbouring vehicles, where the indication Includes at least an information length and a data rate of the received packets. At 606, a determination is made, for example by a MCU, as to whether a resource employed with the ITS messages that are being broadcast should be adapted or changed based on the packet count. In this regard, in some examples at 606 the determination is whether a fair resource adaption (e.g. of one or more of data-rate, message-rate, transmit power) may be needed or may be beneficial to the ITS system (that includes multiple communicating ITS stations), as a whole. In some examples, the determination at 606 may also obtain data from memory in 610.

If the determination is that the resource(s) employed with the ITS messages that are being broadcast should not be adapted or changed based on the packet count, then at 612, at least one ITS message is broadcast using the same (i.e. non-adjusted) at least one ITS broadcast transmission parameter. The flowchart then loops back to 602. However, if the determination is that the resource(s) employed with the ITS messages that are being broadcast should be adapted or changed based on the packet count, then the flowchart moves to 608 where the one or more resources are adapted based on the packet count. In some examples, the one or more resources may be increased or decreased at 608 by a fixed amount, or by an amount that is dependent upon the packet count. At 614, at least one ITS message is broadcast using the adjusted at least one ITS broadcast transmission parameter. The flowchart then loops to 602. In some examples, this change in resource may also be recorded in memory 610.

In some examples, the circuits herein described may be implemented using discrete components and circuits, whereas in other examples the circuit may be formed in integrated form in an integrated circuit. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A skilled artisan will appreciate that the level of integration of processor circuits or components may be, in some instances, implementation-dependent. Furthermore, a single processor or MCU may be used to implement a processing of CBR information as well as performing a packet count of received ITS signals from other vehicles, as well as some or all of the other mentioned MCU functions. Clearly, the various components within the ITS can be realized in discrete or integrated component form, with an ultimate structure therefore being an application-specific or design selection.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the host processor for an intelligent transportation system, ITS, for a vehicle, may be implemented as circuitry located on a single integrated circuit. Here, the host processor circuitry comprises an input port for operably coupling to a speed sensor; and a processing circuit configured to process the speed information received from the speed sensor and adapt a performance of the ITS of the vehicle in response thereto. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired packet counting and processing by operating in accordance with suitable program code, such as minicomputers, personal computers, automotive and other embedded systems, cell phones and various other wireless devices, commonly denoted in this application as 'computer systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. An intelligent transportation system (ITS) for a vehicle, the ITS comprising:
    a packet count estimator arranged to receive broadcast ITS transmissions from a plurality of neighboring vehicles and provide an indication of a number of packets received from the plurality of neighboring vehicles, where the indication includes at least an information length and a data rate of the received packets based on a total time a communication channel is busy;
    a fair resource allocator circuit operably coupled to the packet count estimator and configured to improve fairness in allocation of channel resources for the broadcast ITS transmissions by adjusting at least one ITS broadcast transmission parameter of the ITS based on the indication of the number of received packets; and
    a transmitter operably coupled to the fair resource allocator circuit and configured to broadcast at least one ITS message to neighboring vehicles using the adjusted at least one ITS broadcast transmission parameter.

2. The ITS of claim 1 wherein the packet count estimator is configured to receive physical layer information of the broadcast ITS transmissions and determine therefrom the number of packets received from the plurality of neighboring vehicles.

3. The ITS of claim 1 wherein the at least one ITS broadcast transmission parameter is from a group of: transmission data-rate, transmission message-rate, transmit power.

4. The ITS of claim 1 further comprising a channel busy ratio (CBR) circuit arranged to sense when the communication channel is being used to receive ITS information and provide an indication of a time that the channel is in use, wherein the packet count estimator is configured to use the indication of the time, together with the indication of at least an information length and a data rate of the received packets, in a determination of a number of packets received from the, or each of the, plurality of neighboring vehicles.

5. The ITS of claim 1 further comprising a memory coupled to the fair resource allocator circuit and the packet count estimator and arranged to store at least one of: packet count data, ITS broadcast transmission parameter data, an indication of at least an information length and a data rate of the received packets, wherein the fair resource allocator circuit is configured to adjust at least one ITS broadcast transmission parameter of the ITS based on at least a portion of the stored data.

6. The ITS of claim 1, wherein the packet count estimator is configured to perform a packet count estimation based on a total of: packets sent, packets received, and a total number of packets sensed, while at least one communication channel employed by the ITS is busy.

7. The ITS of claim 6, wherein the total packet count is determined over a specified time period (θ) while the vehicle is not sending ITS packets.

8. The ITS of claim 1 further comprising a microcontroller or a host processor configured to include the fair resource allocator circuit and the packet count estimator.

9. The ITS of claim 8 wherein the microcontroller or the host processor is configured to provide an indication of the adjusted at least one ITS broadcast transmission parameter to a vehicle to roadside (V2X) infrastructure or on a vehicle to vehicle (V2V) basis.

10. The ITS of claim 1 wherein the ITS is configured to support a plurality of different data rates and the fair resource allocator circuit switches the ITS broadcast transmission parameter between two of the plurality of different data rates based on at least in part the indication of the number of received packets.

11. A host processor for an intelligent transportation system (ITS) for a vehicle, the host processor comprising:
 a packet count estimator arranged to receive broadcast ITS transmissions from a plurality of neighboring vehicles and provide an indication of a number of packets received from the plurality of neighboring vehicles, where the indication includes at least an information length and a data rate of the received packets based on a total time a communication channel is busy; and
 a fair resource allocator circuit operably coupled to the packet count estimator and configured to adjust at least one ITS broadcast transmission parameter of the ITS for ITS broadcast transmissions, based on the indication of a number of received packets.

12. A method for operating an intelligent transportation system (ITS) for a vehicle, the method comprising:
 receiving broadcast ITS transmissions from a plurality of neighboring vehicles over a communication medium;
 via a packet count estimation circuit, providing an indication of a number of packets received from the plurality of neighboring vehicles, where the indication includes at least an information length and a data rate of the received packets based on a total time the communication medium is busy;
 allocating use of the communication medium by the ITS by adjusting at least one ITS broadcast transmission parameter of the ITS based on the indication of the number of received packets; and
 broadcasting at least one ITS message to neighboring ITS systems over the communication medium using the adjusted at least one ITS broadcast transmission parameter.

13. The host processor of claim 11 further comprising:
 a transmitter operably coupled to the fair resource allocator circuit and configured to broadcast at least one ITS message to neighboring ITS systems using the adjusted at least one ITS broadcast transmission parameter.

14. The host processor of claim 11 wherein the packet count estimator is configured to receive physical layer information of the broadcast ITS transmissions and determine therefrom the number of packets received from the plurality of neighboring vehicles.

15. The host processor of claim 14 wherein the at least one ITS broadcast transmission parameter is from a group of: transmission data-rate, transmission message-rate, transmit power.

16. The host processor of claim 14 further comprising a memory coupled to the fair resource allocator circuit and the packet count estimator and arranged to store data including at least one of: packet count data, ITS broadcast transmission parameter data, an indication of at least an information length and a data rate of the received packets, wherein the fair resource allocator circuit is configured to adjust at least one ITS broadcast transmission parameter of the ITS based on at least a portion of the stored data.

17. The host processor of claim 14 wherein the host processor is configured to provide an indication of the adjusted at least one ITS broadcast transmission parameter to a vehicle to roadside (V2X) infrastructure or on a vehicle to vehicle (V2V) basis.

18. The host processor of claim 14 wherein the ITS supports a plurality of different data rates and the fair resource allocator circuit switches the ITS broadcast transmission parameter between two of the plurality of different data rates based on at least in part the indication of the number of received packets.

19. The host processor of claim 11 further comprising a channel busy ratio, CBR, circuit arranged to sense when the communication channel is being used to receive ITS information and provide an indication of a time that the channel is in use, wherein the packet count estimator is configured to use the indication of the time, together with the indication of at least an information length and a data rate of the received packets, in a determination of a number of packets received from the, or each of the, plurality of neighboring vehicles.

20. The host processor of claim 11 wherein a packet count estimation performed by packet count estimator is based on a total of: packets sent, packets received, and a total number of packets sensed, while at least one communication channel employed by ITS is busy.

* * * * *